Patented Mar. 8, 1938

2,110,503

UNITED STATES PATENT OFFICE 2,110,503

UPPER CYLINDER LUBRICANT

Alexander Duckham, London, England, assignor to Alexander Duckham & Company Limited, London, England No Drawing. Application November 16, 1936, Serial No. 111,176. In Great Britain April 3, 1936

8 Claims. (Cl. 87—9)

The invention relates to lubricating substances or compositions which are suitable for use as upper cylinder lubricants for internal combustion engines.

Solid or semi-solid lubricants, such as those containing waxes and/or naphthalene have been added to the fuel of internal combustion engines for the purpose of effecting lubrication of the cylinder walls, piston rings, valves and valve stems.

In some cases, for example where the tank of a motor car is not in use for some time after the introduction of lubricants of the above nature, particularly if the temperature is near that of the freezing point of water, solution may be slow, and there may be an undesirable concentration of material at the bottom of the fuel tank.

It is the object of the invention to provide a lubricating substance or composition for addition to liquid fuels, which will dissolve in the fuels of internal combustion engines and which will be free from any tendency to cause the collection of such relatively concentrated solutions of the substance or composition at the bottom of the fuel containers.

The invention consists in a solid or semi-solid upper cylinder lubricant which is completely soluble in motor fuel and has a lower apparent density than that of the motor fuel due to incorporation in the mass of small gaseous or vaporous inclusions.

The invention also consists in the method of forming a solid or semi-solid upper cylinder lubricant which will float upon the motor fuel and is completely soluble therein which consists in incorporating in the mass small gaseous or vaporous inclusions.

If the mass has an apparent density of about 0.7, it will float in petrol and other internal combustion engine fuels.

The lubricant of the invention will remain floating in motor fuel into which it is introduced until solution is substantially complete, the more concentrated solution forming about the material descending into the body of the fuel substantially as rapidly as it forms by virtue of its greater density, and becoming dispersed throughout the bulk of the fluid.

The lubricant of the invention may be formed from any suitable substances or compositions which are soluble in motor fuels and have the desired lubricating action. Suitable additions may be made to the materials to render them more easily moulded and/or to modify their solubility, consistency or lubricating properties.

The material may comprise a mineral wax or a non-mineral wax or a mixture of these. A desirable composition which may be employed is one comprising a mineral wax and a non-mineral wax in admixture in such proportions as to have a setting range of 100° F. to 150° F. Suitable mineral waxes are paraffin and ceresin wax, whilst the non-mineral or natural waxes comprise those having a sufficiently high degree of solubility in the motor fuels commonly employed. In some mixtures the addition of an aromatic hydrocarbon, for example, naphthalene, and/or anthracene, may conveniently be made to facilitate solution of the whole mixture, 5 to 10% being convenient quantities. Other suitable compositions which may be employed as lubricants are solidified oils prepared by usual, well-recognized methods, such as by the addition of aluminium stearate or oleate to oils.

In carrying the invention into effect in the production of a solid upper cylinder lubricant, two to three parts of mineral wax and one part of a beeswax are melted together, with the addition of naphthalene if desired, in a vessel capable of withstanding pressure and fitted with means for extruding the contents through a suitable relief valve. Gas at a pressure which may be, for example, 60 lbs. per square inch is introduced into the vessel, carbon dioxide being a suitable gas. The molten wax mixture having absorbed a quantity of the gas is extruded through the relief valve at a temperature a little above the setting temperature, which is, of course, dependent on the wax mixture employed. In the case of the example given above this will be between 120°–135° F. The absorbed gas is liberated on congealing of the mixture, producing a cooling effect by its expansion and forming a large number of isolated vesicles or cellules in the congealing mass. The semi-congealed mass may be formed into slabs and afterwards cut into pieces of any desired form, or means may be arranged to cut the extruded mass into portions of desired size as it leaves the extrusion nozzle.

According to a further convenient method of carrying the invention into effect, the wax mixture referred to above may be melted in a suitable apparatus adapted to beat the melt in such a way as to entrain air or other gas which may be above the melted mass. By maintaining the temperature at or just above the melting point of the wax mixture, gas beaten into the body will be retained sufficiently well to enable a final product to be obtained containing sufficient gas cellules or vesicles distributed throughout the mass to give an apparent density less than that of petrol or other motor fuel. After being allowed to congeal the mass may be cut to any desired shape or size.

Any other means of dispersing a large number of small quantities of gas or vapour in the body of a solid or semi-solid substance or composition may be employed in carrying out the invention.

I claim:

1. A semi-solid upper cylinder lubricant which is completely soluble in motor fuel and has a lower apparent density than that of the motor fuel due to occlusion in the lubricant of gaseous bubbles.

2. An upper cylinder lubricant according to claim 1 wherein the inclusions are constituted by gas which has been dissolved in the lubricant under pressure.

3. The method of forming a semi-solid upper cylinder lubricant which will float upon the motor fuel and is completely soluble therein which consists in incorporating in the lubricant small gaseous inclusions sufficient to render the lubricant buoyant by the occlusion of the gas bubbles therein.

4. Method according to claim 3 which consists in introducing the gas into the mass under pressure.

5. Method according to claim 3 which consists in introducing the gas into the molten lubricant by beating supernatant gas into the lubricant at or about the melting point of the lubricant.

6. Method according to claim 3 which consists in introducing the gas into the lubricant under pressure and in causing the lubricant to congeal under lower pressure.

7. Method according to claim 3 which consists in introducing the gas into the lubricant under pressure and in causing the lubricant to congeal under lower pressure by extruding the lubricant.

8. Method according to claim 3 which consists in introducing the gas into the lubricant under pressure and in causing the lubricant to congeal under lower pressure after extrusion of the lubricant.

ALEXANDER DUCKHAM.